D. W. CROSLAND.
ROLLER BEARING.
APPLICATION FILED JAN. 10, 1913.
1,096,528.
Patented May 12, 1914.
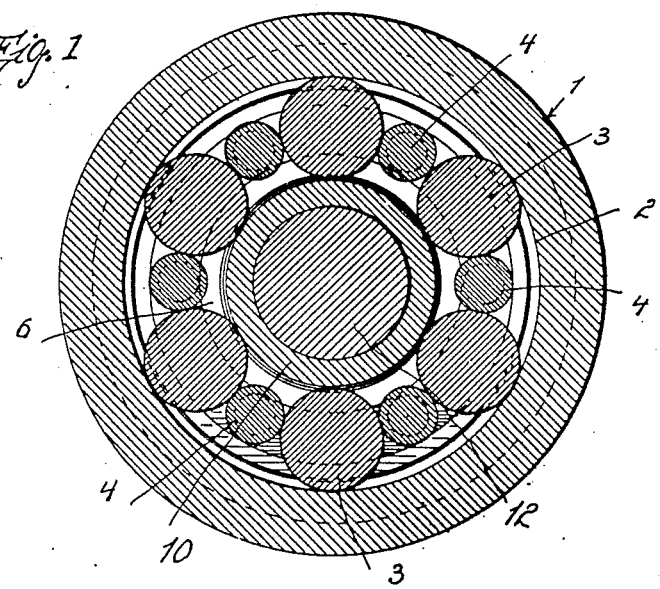
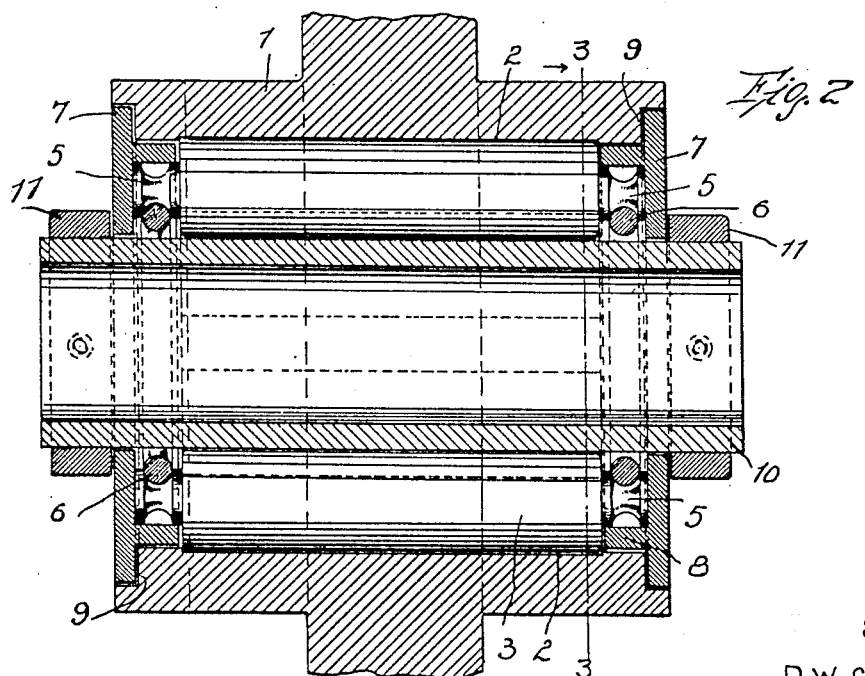
Witnesses
Robert M. Sutphen
A. I. Hurd
Inventor
D. W. Crosland
By Watson E. Coleman
Attorney

UNITED STATES PATENT OFFICE.

DELEVANTE W. CROSLAND, NEWARK, CALIFORNIA.

ROLLER-BEARING.

1,096,528.	Specification of Letters Patent.	Patented May 12, 1914.

Application filed January 10, 1913. Serial No. 741,309.

*To all whom it may concern:*

Be it known that I, DELEVANTE W. CROSLAND, a subject of the King of England, residing at Newark, in the county of Alameda and State of California, have invented certain new and useful Improvements in Roller-Bearings, of which the following is a specification, reference being had to the accompanying drawings.

This invention relates to new and useful improvements in roller bearings for wheels or pulleys revolving on an axle or horizontal shaft, also for any axle or horizontal shaft revolving in a bearing or box and is, therefore, of universal adaptability and is applicable for either traction haulage or power.

The object of this invention is the production of a roller bearing which shall be frictionless and thus obviate the necessity of lubrication.

A further object of this invention resides in providing a device which is extremely simple and durable in construction, being inexpensive to manufacture and at the same time very efficient and useful in operation.

With these and other objects in view, this invention consists in the novel combination and arrangement of parts whereby all the rollers are caused to maintain each other in their relative positions by cohesion, as will be hereinafter particularly pointed out.

In the accompanying drawing forming a part of this application, Figure 1 is a vertical transverse section through the complete bearing; and Fig. 2 is a vertical longitudinal section therethrough.

In describing my invention, I shall refer to the drawing in which similar reference characters designate corresponding parts throughout the several views and in which—

1 indicates a detachable liner or bushing, the exterior of which can be any desired shape. The interior is provided with a recess 2 around its inner periphery in which are seated several parallel main rollers 3. These main rollers are equal in length to the width of the recess 2 so that there will be no axial movement of said main rollers 3 in the bushing 1 and in order to space these main rollers 3 equally from one another, I provide idle rollers 4. These idle rollers are smaller in diameter and of greater length than the main rollers 3 and have their ends which project equally beyond the ends of the main rollers, grooved, as shown at 5. These idle rollers 4 which actually contact with the main rollers 3, are adapted to space the latter equally throughout the inner periphery of the bushing 1, it being understood, however, that said idle rollers 4 do not contact with the bushing 1 and in order to retain said idle rollers in position and cause them to create cohesion with the main rollers, I provide rotating covers 7. These rotating covers have annular flanges 8 or hoops encircling and contacting with the outer peripheries of said projecting ends 5, but the outer peripheries of these flanges or hoops do not contact with the inner periphery of the bushing 1. In order to retain said projecting ends within these hoops or the like, I provide a pair of freely rotating rings 6 which are disposed within the grooves 5 of the projecting ends of said idle rollers 4.

A horizontal journal or the like 10 which is disposed through the bushing 1, contacts with the inner peripheries of the main rollers 3 and forms a track for the latter to roll upon. This journal 10 can be fitted to any axle or shaft 12 and secured thereon. I also provide a pair of collars 11 which are removably secured on said journal 10 to retain the rotating covers 7 in position and thus keep the parts of the roller bearing together. It will, therefore, be seen that the idle rollers, contacting with the main rollers, will revolve in the reverse direction to the latter; also that the rotating rings 6, contacting with the inner circle of the projecting ends of the idle rollers will rotate in the same direction as the bushing 1, while the rotating covers 7 will rotate in the same direction as the shaft or axle and the rotating ring 6 will, of course, rotate in the reverse direction.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described my device in detail, what I particularly claim as my invention is:—

In a roller bearing, a casing provided with an annular recess in its inner face, a journal adapted to accommodate a shaft extending through the casing, a plurality of load bearing rollers contacting with both the casing and the journal, said rollers riding in the annular recess of the casing, intermediate rollers having their ends projecting beyond the load bearing rollers and provided with annular grooves, closing covers for the ends of the casing surrounding the journal and capable of independent movement therearound, each of such rings being provided with a flange directed inwardly of the casing and affording a bearing surface to contact with the projecting ends of the intermediate rollers, means for holding the closing covers against endwise movement on the journal, and freely rotatable rings surrounding the journal and interposed between the latter and the ends of the intermediate rollers and accommodated within the grooves of said last named rollers.

In testimony whereof I hereunto affix my signature in the presence of two witnesses.

DELEVANTE W. CROSLAND.

Witnesses:
A. T. BIDDLE,
E. M. BIDDLE.

---

Copies of this patent may be obtained for five cents each, by addressing the "Commissioner of Patents, Washington, D. C."